(12) United States Patent
Ehlers et al.

(10) Patent No.: US 12,079,987 B2
(45) Date of Patent: Sep. 3, 2024

(54) AUTOMATED QUALITY ASSESSMENT OF ULTRA-WIDEFIELD ANGIOGRAPHY IMAGES

(71) Applicant: THE CLEVELAND CLINIC FOUNDATION, Cleveland, OH (US)

(72) Inventors: Justis P. Ehlers, Cleveland, OH (US); Sunil K. Srivastava, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 345 days.

(21) Appl. No.: 17/479,717

(22) Filed: Sep. 20, 2021

(65) Prior Publication Data

US 2022/0092776 A1 Mar. 24, 2022

Related U.S. Application Data

(60) Provisional application No. 63/182,416, filed on Apr. 30, 2021, provisional application No. 63/080,688, filed on Sep. 19, 2020.

(51) Int. Cl.
*G06T 7/00* (2017.01)

(52) U.S. Cl.
CPC .. *G06T 7/0012* (2013.01); *G06T 2207/10101* (2013.01); *G06T 2207/20081* (2013.01);
(Continued)

(58) Field of Classification Search
CPC ......... G06T 7/0012; G06T 2207/10101; G06T 2207/20081; G06T 2207/20084;
(Continued)

(56) References Cited

U.S. PATENT DOCUMENTS

| 2010/0097573 A1* | 4/2010 | Verdooner | A61B 3/14 |
| | | | 351/206 |
| 2013/0176532 A1* | 7/2013 | Sharma | A61B 3/102 |
| | | | 351/246 |

(Continued)

OTHER PUBLICATIONS

Ishibazawa A, Nagaoka T, Takahashi A, et al. Optical coherence tomography angiography in diabetic retinopathy: A prospective pilot study. Am J Ophthalmol. 2015;160(1):35-44.e1. doi: 10.1016/j.ajo.2015.04.021.

(Continued)

*Primary Examiner* — Nimesh Patel
(74) *Attorney, Agent, or Firm* — Tarolli, Sundheim, Covell & Tummino LLP

(57) ABSTRACT

Systems and methods are provided for fully automated quality assessment of ultra-widefield angiography images. A series of ultra-widefield angiography images of a retina of a patient are obtained and each of the series of ultra-widefield angiography images are provided to a neural network trained on a set of labeled images to generate a quality parameter for each of the series of ultra-widefield angiography images representing a quality of the image. Each of the set of labeled images are assigned to one of a plurality of classes representing image quality. A user interface provides an instruction to a user to obtain a new series of ultra-widefield angiography images of the retina of the patient if no image of the series of ultra-widefield angiography images has a quality parameter that meets a threshold value.

17 Claims, 3 Drawing Sheets

(52) U.S. Cl.
CPC ............... G06T 2207/20084 (2013.01); G06T 2207/30041 (2013.01); G06T 2207/30168 (2013.01)

(58) Field of Classification Search
CPC . G06T 2207/30041; G06T 2207/30168; G06T 2207/10016; G06T 2207/10064; G06T 2207/20076; G06T 7/00; G06T 2207/10024; G06T 2207/10152; G06T 3/0068; G06T 7/0014; G06T 2207/30096; G06T 2207/30104; G06T 7/20; G06T 2207/20036; G06T 7/11; G06T 2207/10081; G06T 2207/10088; G06T 2210/41; G06T 2207/30101; G06T 13/80; G06T 2200/04; G06T 2207/30004; G06T 7/33; G06T 9/002; G06T 7/174; G06T 7/187; G06T 7/337; G06T 7/75; A61B 3/14; A61B 3/102; A61B 3/12; A61B 5/0066; A61B 3/0025; A61B 5/14555; A61B 3/1216; A61B 5/12; A61B 8/10; A61B 3/0058; G16H 50/20; G16H 40/63; G16H 40/67; G16H 20/17; G16H 30/40; G16H 30/20; G16H 50/70; G16H 15/00; G16H 20/30; G16H 10/40; G06N 3/045; G06N 3/08; G06N 7/01; G06N 20/00; G06N 3/084; G06N 20/20; G06N 3/044; G06N 3/04; G06N 3/042; G06N 3/088; G06N 5/02; G06N 5/04; G06N 7/023; G06V 2201/03; G06V 40/18; G06V 40/193; G06V 10/267; G06V 10/26; G06V 10/82; G06V 10/764; G06V 40/20; G06V 10/40; G06V 10/70; G06V 30/14; G06V 30/36; G06V 40/13; G06V 40/1371; G06V 40/168; G06V 40/171; G06V 40/172; G06V 40/197; G06F 3/017; G06F 18/24; G06F 3/14; G06F 16/285; G06F 3/013
See application file for complete search history.

(56) References Cited

U.S. PATENT DOCUMENTS

| | | | | |
|---|---|---|---|---|
| 2015/0110372 | A1* | 4/2015 | Solanki | A61B 3/14 382/130 |
| 2018/0315193 | A1* | 11/2018 | Paschalakis | G06V 40/193 |
| 2020/0342595 | A1* | 10/2020 | Jia | G06T 7/0012 |
| 2021/0272283 | A1* | 9/2021 | An | G06T 7/11 |

OTHER PUBLICATIONS

Ehlers JP, Wang K, Vasanji A, Hu M, Srivastava SK. Automated quantitative characterisation of retinal vascular leakage and microaneurysms in ultra-widefield fluorescein angiography. Br J Ophthalmol. 2017;101(6):696-699. doi:10.1136/bjophthalmol-2016-310047.

Wessel MM, Aaker GD, Parlitsis G, Cho M, D'Amico DJ, Kiss S. Ultra-wide-field angiography improves the detection and classification of diabetic retinopathy. Retina. 2012;32:785-791. doi:10.1097/IAE.0b013e3182278b64.

Kiss S, Berenberg TL. Ultra widefield fundus imaging for diabetic retinopathy. Curr Diab Rep. 2014;14(8). doi:10.1007/s11892-014-0514-0.

Manjunath V, Papastavrou V, Steel D, et al. Wide-field imaging and OCT vs clinical evaluation of patients referred from diabetic retinopathy screening. Eye. 2015;29(3):416-423. doi:10.1038/eye.2014.320.

Mendis KR, Balaratnasingam C, Yu P, et al. Correlation of histologic and clinical images to determine the diagnostic value of fluorescein angiography for studying retinal capillary detail. Investig Ophthalmol Vis Sci. 2010;51(11):5864-5869. doi: 10.1167/iovs.10-5333.

Al-Sheikh M, Falavarjani KG, Akil H, Sadda SR. Impact of image quality on OCT angiography based quantitative measurements. Int J Retin Vitr. 2017;3(1). doi:10.1186/s40942-017-0068-9.

Fang L, Cunefare D, Wang C, Guymer RH, Li S, Farsiu S. Automatic segmentation of nine retinal layer boundaries in OCT images of non-exudative AMD patients using deep learning and graph search. Biomed Opt Express. 2017;8(5):2732. doi:10.1364/boe.8.002732.

Loo J, Fang L, Cunefare D, Jaffe GJ, Farsiu S. Deep longitudinal transfer learning-based automatic segmentation of photoreceptor ellipsoid zone defects on optical coherence tomography images of macular telangiectasia type 2. Biomed Opt Express. 2018;9(6):2681. doi:10.1364/boe.9.002681.

Tennakoon R, Mahapatra D, Roy P, Sedai S, Garnavi R. Image Quality Classification for DR Screening Using Convolutional Neural Networks. In: ; 2017:113-120. doi:10.17077/omia.1054.

Chen LC, Papandreou G, Kokkinos I, Murphy K, Yuille AL. Semantic image 295 segmentation with deep convolutional nets and fully connected CRFs. 3rd Int Conf Learn 296 Represent ICLR 2015—Conf Track Proc. 2015.

Zhang L, Gooya A, Dong B, et al. Automated quality assessment of cardiac MR images using convolutional neural networks. Lect Notes Comput Sci (including Subser Lect Notes Artif Intell Lect Notes Bioinformatics). 2016;9968:138-145. doi: 10.1007/978-3-319-46630-9_14.

Kanagasingam Y, Xiao D, Vignarajan J, Preetham A, Tay-Kearney ML, Mehrotra A. Evaluation of Artificial Intelligence-Based Grading of Diabetic Retinopathy in Primary Care. JAMA Netw open. 2018;1(5):e182665. doi:10.1001/amanetworkopen.2018.2665.

Abràmoff MD, Lavin PT, Birch M, Shah N, Folk JC. Pivotal trial of an autonomous AI-based diagnostic system for detection of diabetic retinopathy in primary care offices. npj Digit Med. 2018;1(1). doi: 10.1038/s41746-018-0040-6.

Lauermann JL, Treder M, Alnawaiseh M, Clemens CR, Eter N, Alten F. Automated OCT angiography image quality assessment using a deep learning algorithm. Graefe's Arch Clin Exp Ophthalmol. 2019;257(8):1641-1648. doi:10.1007/s00417-019-04338-7.

FDA permits marketing of artificial intelligence-based device to detect certain diabetes-related eye problems. U.S Food & Drug Administration. doi:10.31525/fda2-ucm604357.htm.

Alsaih K, Lemaitre G, Rastgoo M, Massich J, Sidibé D, Meriaudeau F. Machine learning techniques for diabetic macular edema (DME) classification on SD-OCT images. Biomed Eng Online. 2017;16(1). doi:10.1186/s12938-017-0352-9.

Murugeswari S, Sukanesh R. Investigations of severity level measurements for diabetic macular oedema using machine learning algorithms. Ir J Med Sci. 2017;186(4):929-938. doi:10.1007/s11845-017-1598-8.

Gulshan V, Peng L, Coram M, et al. Development and validation of a deep learning algorithm for detection of diabetic retinopathy in retinal fundus photographs. JAMA—J Am Med Assoc. 2016;316(22):2402-2410. doi: 10.1001/jama.2016.17216.

Cabrera DeBuc D, Somfai GM, Koller A. Retinal microvascular network alterations: potential biomarkers of cerebrovascular and neural diseases. Am J Physiol Heart Circ Physiol 2017;312(2):H201-H12.

MacGillivray TJ, Trucco E, Cameron JR, et al. Retinal imaging as a source of biomarkers for diagnosis, characterization and prognosis of chronic illness or long-term conditions. Br J Radiol 2014;87(1040):20130832.

Poplin R, Varadarajan AV, Blumer K, et al. Prediction of cardiovascular risk factors from retinal fundus photographs via deep learning. Nat Biomed Eng 2018;2(3):158-64.

Liskowski P, Krawiec K. Segmenting Retinal Blood Vessels With Deep Neural Networks. IEEE Trans Med Imaging 2016;35(11):2369-80.

Joonyoung S, Boreom L. Development of automatic retinal vessel segmentation method in fundus images via convolutional neural networks. Conf Proc IEEE Eng Med Biol Soc 2017;2017:681-4.

(56) References Cited

OTHER PUBLICATIONS

Yin B, Li H, Sheng B, et al. Vessel extraction from non-fluorescein fundus images using prientation-aware detector. Med Image Anal 2015;26(1):232-42.

Manivannan A, Plskova J, Farrow A, et al. Ultra-wide-field fluorescein angiography of the ocular fundus. Am J Ophthalmol 2005;140(3):525-7.

Ghasemi Falavarjani K, Wang K, Khadamy J, Sadda SR. Ultra-wide-field imaging in diabetic retinopathy; an overview. J Curr Ophthalmol 2016;28(2):57-60.

Ehlers JP, Jiang AC, Boss JD, et al. Quantitative Ultra-Widefield Angiography and Diabetic Retinopathy Severity: An Assessment of Panretinal Leakage Index, Ischemic Index and Microaneurysm Count. Ophthalmology 2019; 126(11):1527-32.

Ding L, Kuriyan A, Ramchandran R, Sharma G. Quantification of longitudinal changes in retinal vasculature from wide-field flourescein angiography via a novel registration and change detection approach. IEEE International Conference on Acoustics, Speech and Signal Processing (ICASSP)2018.

Ding L, Kuriyan A, Ramchandran R, Sharma G. Multi-Scale morphological analysis for retinal vessel detection in wide-field flourescein angiography. Western NY Image and Signal 2017.

Fan W, Uji A, Borrelli E, et al. Precise Measurement of Retinal Vascular Bed Area and Density on Ultra-wide Fluorescein Angiography in Normal Subjects. Am J Ophthalmol 2018;188:155-63.

Moosavi A, Figueiredo N, Prasanna P, et al. Imaging Features of Vessels and Leakage Patterns Predict Extended Interval Aflibercept Dosing Using Ultra-Widefield Angiography in Retinal Vascular Disease: Findings from the PERMEATE Study. 2020.

Jiang A, Srivastava S, Figueiredo N, et al. Repeatability of automated leakage quantification and microaneurysm identification utilising an analysis platform for ultra-widefield fluorescein angiography. Br J Ophthalmol 2019.

Ronneberger O, Fischer P, Brox T. U-Net: Convolutional Networks for Biomedical Image Segmentation. Computer Science Department and BIOSS Centre for Biological Signaling Studies, University of Freiburg, Germany2015.

Peng C, Zhang X, Yu G, et al. Large Kernel Matters—Improve Semantic Segmentation by Global Convolutional Network. 2017.

Wang K, Falavarjani KG, Nittala MG, et al. Ultra-Wide-Field Fluorescein Angiography-Guided Normalization of Ischemic Index Calculation in Eyes With Retinal Vein Occlusion. Invest. Ophthalmol. Vis. Sci. 2018;59(8):3278-3285.

Wenying F, Uji A, Borreli E et al. Precise Measurement of Retinal Vascular Bed Area and Density on Ultra-wide Fluorescein Angiography in Normal Subjects American Journal of Ophthalmology, vol. 188, 155-163.

\* cited by examiner

AUTOMATED QUALITY ASSESSMENT OF ULTRA-WIDEFIELD ANGIOGRAPHY IMAGES

RELATED APPLICATIONS

The present application claims priority to each of U.S. Provisional Patent Application Ser. No. 63/080,688 filed Sep. 19, 2020 and entitled "AUTOMATED QUALITY ASSESSMENT OF ULTRA-WIDEFIELD ANGIOGRAPHY IMAGES," and U.S. Provisional Patent Application Ser. No. 63/182,416 filed Apr. 30, 2021 and entitled AUTOMATED SELECTION OF ULTRA-WIDEFIELD ANGIOGRAPHY IMAGES." Each of these applications is incorporated herein by reference in its entirety for all purposes.

TECHNICAL FIELD

The present invention relates generally to the field of medical images, and more particularly, to automated quality assessment of ultra-widefield angiography images.

BACKGROUND OF THE INVENTION

Fluorescein angiography (FA) is a critical tool in the diagnosis and management of retinal disease, such as diabetic retinopathy. In recent years, advancements in angiographic imaging technology have enabled ultra-widefield fluorescein angiography (UWFA), capable of capturing a two-hundred-degree field of view and visualizing up to 3.2 times more retinal area compared with conventional imaging. Since more of the retina can be imaged with a single image, this often translates to greater ease for the patient and photographer. In addition to being more time consuming, conventional angiography also suffers from variable image quality. According to one study, 31.6% of conventional angiographic images were ungradable, primarily due to media opacities and poor eye dilation.

Though eye dilation is less of a factor in non-mydriatic UWFA systems, UWFA is similarly affected by media opacities (e.g., vitreous debris, hemorrhage, and cataract), lid artifacts, optimal eye-camera distance, sufficient dye infusion, injection-to-image time, and centration. Due to the variable quality, typical sample sizes range from twenty to fifty images to ensure sufficient numbers of good quality images are obtained. Following acquisition, physicians must manually review this large quantity of images. This time-consuming process can significantly limit workflow efficiency, particularly in busy retina clinics and reduce the time available to review the optimal images. Moreover, if no images of sufficient quality were obtained, the patient is no longer at the camera and may require an additional angiography study. Finally, significant human reader time is required for reading centers and clinical trials to identify images of optimal quality for review.

SUMMARY OF THE INVENTION

In accordance with an aspect of the present invention, a method is provided for fully automated quality assessment of ultra-widefield angiography images. A series of ultra-widefield angiography images of the retina of a patient are obtained and each of the series of ultra-widefield angiography images are provided to a neural network trained on a set of labeled images to generate a quality parameter for each of the series of ultra-widefield angiography images representing a quality of the image. Each of the set of labeled images is assigned to one of a plurality of classes representing image quality. An instruction is provided to a user to obtain a new series of ultra-widefield angiography images of the retina of the patient if the no image of the series of ultra-widefield angiography images has a quality parameter that meets a threshold value. In addition, the system provides automated presentation of the high quality images to the clinician.

In accordance with another aspect of the present invention, a system is provided for fully automated quality assessment of ultra-widefield angiography images. The system includes a processor and a non-transitory computer readable medium storing instructions executable by the processor. The machine executable instructions include an image interface that receives a series of ultra-widefield angiography images of a retina of a patient. A neural network, trained on a set of labeled images, generates a quality parameter for each of the series of ultra-widefield angiography images representing a quality of the image. Each of the set of labeled images is assigned to one of a plurality of classes representing image quality. A user interface provides an instruction to a user to obtain a new series of ultra-widefield angiography images of the retina of the patient if no image of the series of ultra-widefield angiography images has a quality parameter that meets a threshold value.

In accordance with yet another aspect of the present invention, a system is provided for fully automated quality assessment of ultra-widefield angiography images. The system includes an ultra-widefield angiography imaging system, a processor, and a non-transitory computer readable medium that stores instructions executable by the processor. The machine executable instructions include an image interface that receives a series of ultra-widefield angiography images of a retina of a patient from the ultra-widefield angiography imaging system. A neural network, trained on a set of labeled images, generates a quality parameter for each of the series of ultra-widefield angiography images representing a quality of the image. Each of the set of labeled images is assigned to one of a plurality of classes representing image quality. A user interface provides an instruction to a user to obtain a new series of ultra-widefield angiography images of the retina of the patient if the no image of the series of ultra-widefield angiography images has a quality parameter that meets a threshold value. An image selector selects a proper subset of the series of ultra-widefield angiography images according to the quality parameter generated for each image at the neural network.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

The phrase "continuous parameter" is used herein to distinguish numerical values from categorical values or classes, and should be ready to include both truly continuous data as well as discrete interval or ratio data.

As used herein, an "average" of a set of values is any measure of central tendency. For continuous parameters, this includes any of the median, arithmetic mean, and geometric mean of the values. For categorical parameters, the average is the mode of the set of values.

A "subset" of a set as used here, refers to a set containing some or all elements of the set. A "proper subset" of a set contains less than all of the elements of the set.

A parameter is an "ordinal categorical" parameter when the discrete values or categories that can be assumed by the parameter have a defined ranking. For example, a categorical parameter in which a first value represents "high temperatures" and a second value represents "low temperatures" is an ordinal categorical parameter as it is intended herein.

Consideration of retinal image quality is an integral step to obtaining high-value clinical diagnostics. Previous studies on image quality in other imaging modalities, such as optical coherence tomography angiography (OCTA), demonstrated significant impacts to measurements made by automated segmentation and analysis software when image quality was reduced. UWFA images are often highly complex, thus interpretation errors can be propagated without a reliable image quality assessment. Accordingly, the systems and methods described herein provide an automated quality assessment system that dramatically improves workflow, enhances physician interpretation efficiency, optimizes image acquisition, and enables automated computational image analysis. In particular, a neural network model is employed to automate image quality verification and feedback. In the short term, this tool can provide immediate feedback to photographers during image acquisition to enable repeat imaging.

Figure 1:
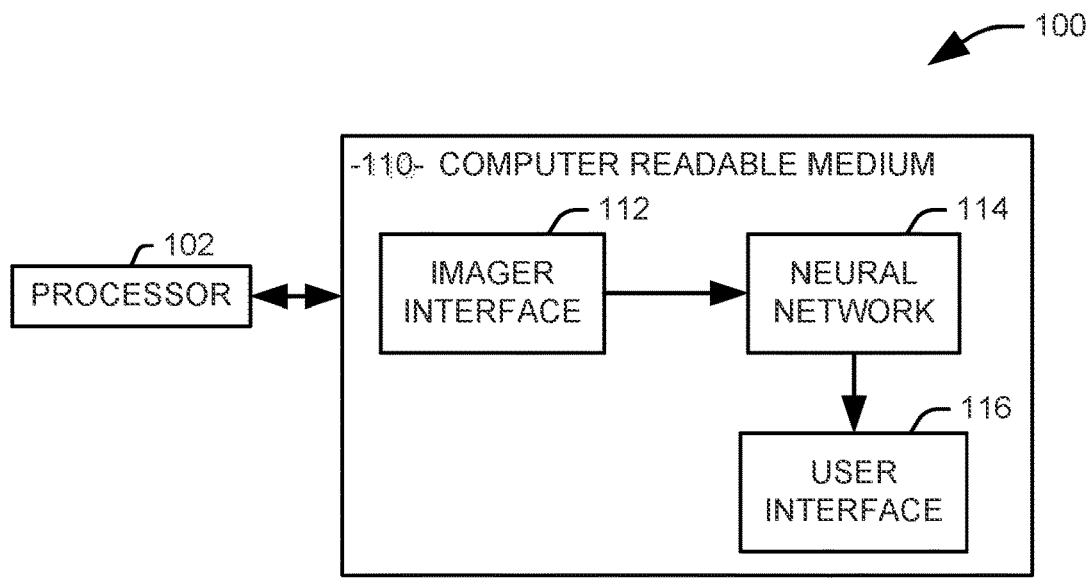
FIG. 1 illustrates one example of a system for fully automated quality assessment of ultra-widefield angiography images.

FIG. 1 illustrates one example of a system 100 for fully automated quality assessment of ultra-widefield angiography images. The system 100 includes a processor 102 and a non-transitory computer readable medium 110 that stores machine executable instructions for assigning a value representing a quality of an image. The machine executable instructions include an imager interface 112 that receives a series of ultra-widefield angiography images of a retina of a patient from an associated imager. For example, the imaging interface 112 can receive the image from the imager via a bus or network connection and condition the image for analysis at a neural network 114. In one example, the neural network 114 can be implemented on a cloud computing system, with the image transmitted to the server containing the neural network 114 via a network interface (not shown).

The neural network 114 determines, for each of the series of ultra-widefield angiography images, a quality parameter representing a quality of the image. In one implementation, the quality parameter is continuous over a defined range, with a first extrema within the range representing a highest image quality and a second extrema within the range representing a lowest image quality. In another implementation, the quality parameter assigned to each image represents its location in an ordinal ranking of the series of ultra-widefield angiography images by quality. In a further implementation, the quality parameter is categorical. In one example, an ordinal categorical quality parameter can assume four values, a first value, representing a highest image quality, a second value, representing an acceptable level of image quality, a third value, representing a poor level of image quality, and a fourth value, representing images that are unacceptable for use in assessing the state of the retina of the patient. In another example, an ordinal categorical quality parameter can assume two values, a first value, representing images acceptable for use in assessing the state of the retina of the patient and a second value, representing images that are unacceptable for use in assessing the state of the retina of the patient.

The neural network 114 includes a plurality of nodes having a plurality of interconnections. Values from the image, for example luminance and/or chrominance values associated with the individual pixels, are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to an activation function at the node. For example, the intermediate node can sum the received values and subject the sum to an identify function, a step function, a sigmoid function, a hyperbolic tangent, a rectified linear unit, a leaky rectified linear unit, a parametric rectified linear unit, a Gaussian error linear unit, the softplus function, an exponential linear unit, a scaled exponential linear unit, a Gaussian function, a sigmoid linear unit, a growing cosine unit, the Heaviside function, or the mish function. A final layer of nodes provides the confidence values for the output classes of the neural network, with each node having an associated value representing a confidence for one of the associated output classes of the classifier.

In one implementation, the neural network 114 can be implemented as a convolutional neural network, which is a feed-forward artificial neural network that includes convolutional layers, which effectively apply a convolution to the values at the preceding layer of the network to emphasize various sets of features within an image. In a convolutional layer, each neuron is connected only to a proper subset of the neurons in the preceding layer, referred to as the receptive field of the neuron. In one implementation, at least one chromatic value (e.g., a value for an RGB color channel, a YCrCb color channel, or a grayscale brightness) associated with each pixel is provided as an initial input to the convolutional neural network.

In another implementation, the neural network 114 can be implemented as a recurrent neural network. In a recurrent neural network, the connections between nodes in the network are selected to form a directed graph along a sequence, allowing it to exhibit dynamic temporal behavior. Unlike a feedforward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory. In another implementation, the neural network 114 is implemented and trained as a discriminative network in a generative adversarial model, in which a generative neural network and the discriminative network provide mutual feedback to one another, such that the generative neural network produces increasingly sophisticated samples for the discriminative network to attempt to classify. Typically, the generative network learns to map from a latent space to a data distribution of interest, while the discriminative network distinguishes candidates produced by the generator from a true data distribution. The generative network's training objective is to increase the error rate of the discriminative network. Each network learns iteratively to better model the true data distribution across the classes of interest.

The neural network 114 is trained on a plurality of labeled ultra-widefield angiography images of the retina. By "labeled images," it is meant that the quality of the image is known, for example, via expert annotation, and one of a plurality of classes associated with image quality is provided to the neural network along with the image during the training process. During training, the weights associated with the interconnections among nodes in the neural network 114 are iteratively changed until, once the network is changed, an output of the network when presented with a novel, unlabeled ultra-widefield angiography images provides a quality parameter representing the quality of the novel image. The quality parameter can be stored on the non-transitory computer readable medium 110.

In one implementation, the plurality of classes used for labelling the data in includes a first class, representing a highest image quality, a second class, representing an acceptable level of image quality, a third class, representing a poor level of image quality, and a fourth class, representing images that are unacceptable for use in assessing the state of the retina of the patient. In one example, images are labeled in the first class when they have at most one minor quality issue, such as presence of eyelashes, and a field of view greater than ninety percent. Images are labeled with the second class when they have at most two minor quality issues or one moderate quality issue, such as slight optic disc and macula centration issues and a field of view greater than seventy percent. Images are labeled with the third class when they have at most two moderate or one significant quality issues, such as poor optic disc and macula centration, and a field of view greater than fifty percent. Images are labeled with the fourth class when they have issues such as complete obstruction of the optic disc or macula or poor dye visibility, or if the field of view is less than fifty percent. It will be appreciated that some or all layers of the neural network can be trained via transfer learning from another system, with only some of the layers trained on ultra-wideband images of the retina. A final layer of the neural network 114 can be implemented as a softmax layer to provide a classification result.

A user interface 116 provides an instruction to a user to obtain a new series of ultra-widefield angiography images of the retina of the patient if the no image of the series of ultra-widefield angiography images has a quality parameter that meets a threshold value. For example, the user interface 116 can include appropriate software instructions for generating a visible, audible, or tactile alert to a user based upon the values of the quality parameters for the series of ultra-widefield angiography images and presenting it to the user at an output device (not shown). It will be appreciated that where the quality parameter is continuous, a threshold value can be selected according to clinical expertise or the requirements of an automated system using the data. Where the quality parameter is ordinal categorical, the categories can be defined such that one of the categories can be defined as a lowest level of acceptable data. It will be appreciated that the threshold can be dynamic, such that the acceptable level of quality is lowered over repeated rounds of image acquisition. Once an acceptable set of images has been acquired, one or more of the series of ultra-wideband angiography images can be stored in memory, for example, at the non-transitory computer readable medium 110.

Figure 2:
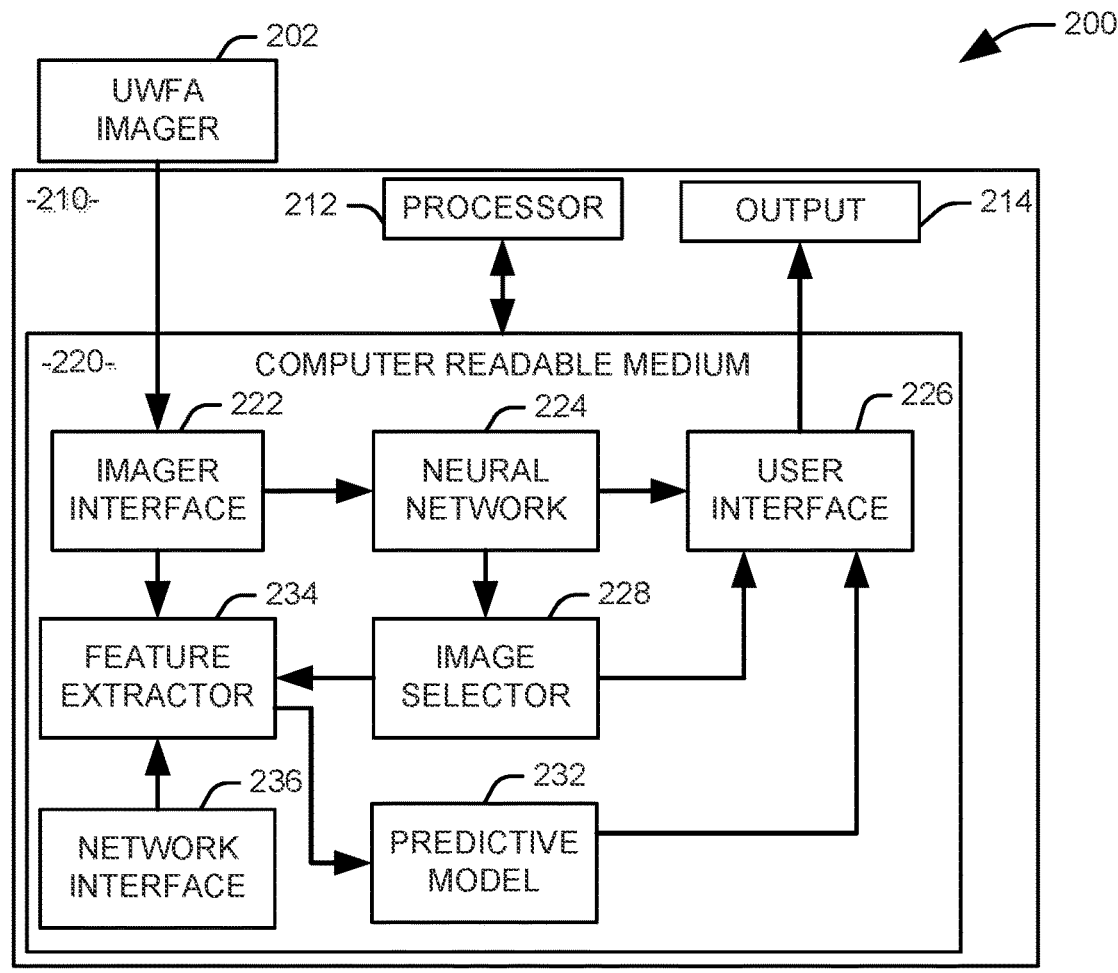
FIG. 2 illustrates one example of a system for fully automated analysis of ultra-widefield angiography images to generate a clinical parameter representing a retina of a patient.

FIG. 2 illustrates one example of a system for fully automated analysis of ultra-widefield angiography images to generate a clinical parameter representing a retina of a patient. The illustrated system 200 includes an ultra-widefield angiography fluorescein (UWFA) imager 202 that acquires a series of ultra-widefield angiography images of a retina of a patient. For example, the imager 202 can include one or more cameras, capable of producing images in the visible or infrared range, paired with appropriate optics to provide a series of ultra-widefield angiography images. It will be appreciated, however, that the systems and methods herein are compatible with the use of dyes other than fluorescein. The images obtained at the imager 202 are provided to an analysis system 210 comprising a processor 212, an output device 214, and a non-transitory computer readable medium 220 storing instructions executable by the processor. The instructions are executable to provide an imager interface 222 that receives the series of ultra-widefield angiography images. The imager interface 222 can apply one or more imaging condition techniques, such as cropping and filtering, to better prepare the image for analysis.

The images are then provided to a neural network 224 that provides a quality parameter representing the quality of the image. In the illustrated implementation, the neural network 224 is trained on ultra-widefield angiography images labeled with one of four classes representing degrees of image quality, and provides an ordinal categorical output that can assume a first value, representing a high quality image, a second value, representing a good quality image, a third value, representing an image of acceptable quality, and a fourth value, representing an image unsuitable for use for segmentation of structures with the retina or evaluation of the state of the patient's retina.

In the illustrated implementation, the neural network 224 is implemented as a convolutional neural network. Many ANN classifiers are fully-connected and feedforward. A convolutional neural network, however, includes convolutional layers in which nodes from a previous layer are only connected to a subset of the nodes in the convolutional layer. In the illustrated example, the neural network includes an input layer that receives a given image of the series of ultra-widefield angiography images as an input, and a series of image processing modules that, collectively, receive the content of the input layer and provide an output representing the given image of the series of ultra-widefield angiography images. Each of the series of image processing modules include a set of convolutional layers that each receive the content of a previous layer and apply a convolution operation, represented by a convolutional kernel having an associated kernel size, to provide a convolved output. A pooling layer replaces sets of pixels within the convolved output with representative values to reduce the dimensionality of the convolved output into a pooled output. It will be appreciated that, in some implementations, a final image processing module of the series will not have a pooling layer. At least one fully connected layer provides the quality parameter from the output of the series of image processing modules. In this implementation, the inventors have determined that an increase of the kernel size to five (i.e., the use of a 5×5 kernel in the convolutional layers) provides improved results for evaluating ultra-widefield images.

A user interface 226 provides an instruction to a user to obtain a new series of ultra-widefield angiography images of the retina of the patient if the no image of the series of ultra-widefield angiography images has a quality parameter that meets a threshold value. In the illustrated implementation using an ordinal categorical value of four values representing progressively decreasing levels of image quality, as described above, the threshold value can be the second value. An image selector 228 selects a proper subset of the series of ultra-widefield angiography images according to the quality parameter generated for each image at the neural network. In the illustrated implementation, the image selector 228 determines the highest quality value of the ordinal categorical parameter assigned to any of the series of ultra-wideband images and selects all images having the determined highest quality value. In one example, the selected images can be displayed to the user at the output device 214 via the user interface 226 and stored on the non-transitory computer readable medium 220.

In one implementation, the image selector 228 can select the proper subset of the series of ultra-widefield angiography images to include a set of highest quality images from each of multiple categories. For example, it will be appreciated that images in a series of ultra-wideband images that are taken shortly after introduction of a dye, such as fluorescein or indocyanine green, will have different properties than images taken toward the end of that sequence. In general, the images can be considered to be early images, taken with sixth seconds of administering the dye, mid or arteriovenous transit images, taken between one and three minutes after administering the dye, and late images, taken more than five minutes after administering the dye.

In one implementation, the timing of images relative to the dye is known, and the image selector 228 can simply select a set of one or more images in each category (e.g., an early/mid category and a late category) having best values for the quality parameter. It will be appreciated, however, that this information is not always available. Accordingly, the image selector 228 can include a second neural network model (not shown), that is trained on labeled images form the various categories. The second neural can sort new series of images into the various categories, allowing for appropriate selection of the highest quality images from each category.

In the illustrated implementation, the proper subset of the series of ultra-wideband images are provided an automated system comprising a machine learning model 232 that determines a clinical parameter representing a state of the retina of the patient from the proper subset of the series of ultra-wideband images. It will be appreciated that the clinical parameter can be categorical or continuous. Where the clinical parameter is categorical, it can represent, for example the presence or absence of a disease or disorder of the retina, improvement or degradation of the condition of the retina, for example, in response to a treatment, a predicted future presence or absence of a disease or disorder, or ranges of likelihoods for one of these categories. Where the clinical parameter is continuous, it can represent, for example, a likelihood of the presence or absence of a disease or disorder, a likelihood that a disease or disorder will occur in the future, or a degree of improvement or degradation of the condition of the retina.

In some implementations, the images are provided directly to the machine learning model 232, with the machine learning model 232 using luminance and chrominance values associated with the pixels of the image directly as image features. In the illustrated implementation, however, the images are provided to a feature extractor 234 that reduces the image data into a feature vector comprising a plurality of values representing the content of the image or images. In particular, the feature extractor 234 extracts a plurality of features, which can be categorical, discrete, and continuous parameters representing the image data. It one example, the feature extractor 234 can also utilize latent values from the neural network 224 as features representing the image or images. Additionally or alternatively, where multiple images are provided, the feature extractor 234 can combine the images into a single composite image and either provide the composite image directly to the machine learning model 232 or extract numerical features from the image. In one implementation, the images can be registered to one another, and the composite image generated as a pixel-by-pixel average of the images. A network interface 236 can retrieve a set of biometric parameters from an associated memory, such as an electronic health records (EHR) database, and additional features can be generated from the biometric parameters.

The machine learning model 232 can be trained on training data representing the various classes of interest. For example, in supervised learning models, a set of examples having labels representing a desired output of the machine learning model 232 can be used to train the system. In one implementation, all of the training data for the machine learning model 232 is generated using images that have been evaluated at the neural network 224 and have been assigned quality parameters that meet the threshold value. The training process of the machine learning model 232 will vary with its implementation, but training generally involves a statistical aggregation of training data into one or more parameters associated with the output classes. For rule-based models, such as decision trees, domain knowledge, for example, as provided by one or more human experts, can be used in place of or to supplement training data in selecting rules for classifying a user using the extracted features. Any of a variety of techniques can be utilized for the models, including support vector machines, regression models, self-organized maps, k-nearest neighbor classification or regression, fuzzy logic systems, data fusion processes, boosting and bagging methods, rule-based systems, or artificial neural networks, such as those described above.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. An SVM classifier utilizes a user-specified kernel function to organize training data within a defined feature space. In the most basic implementation, the kernel function can be a radial basis function, although the systems and methods described herein can utilize any of a number of linear or non-linear kernel functions.

A k-nearest neighbor model populates a feature space with labeled training samples, represented as feature vectors in the feature space. In a classifier model, the training samples are labeled with their associated class, and in a regression model, the training samples are labeled with a value for the dependent variable in the regression. When a new feature vector is provided, a distance metric between the new feature vector and at least a subset of the feature vectors representing the labeled training samples is generated. The labeled training samples are then ranked according to the distance of their feature vectors from the new feature vector, and a number, k, of training samples having the smallest distance from the new feature vector are selected as the nearest neighbors to the new feature vector.

In one example of a classifier model, the class represented by the most labeled training samples in the k nearest neighbors is selected as the class for the new feature vector. In another example, each of the nearest neighbors can be represented by a weight assigned according to their distance from the new feature vector, with the class having the largest aggregate weight assigned to the new feature vector. In a regression model, the dependent variable for the new feature vector can be assigned as the average (e.g., arithmetic mean) of the dependent variables for the k nearest neighbors. As with the classification, this average can be a weighted average using weights assigned according to the distance of the nearest neighbors from the new feature vector. It will be appreciated that k is a metaparameter of the model that is selected according to the specific implementation. The distance metric used to select the nearest neighbors can include a Euclidean distance, a Manhattan distance, or a Mahalanobis distance.

A regression model applies a set of weights to various functions of the extracted features, most commonly linear functions, to provide a continuous result. In general, regression features can be categorical, represented, for example, as zero or one, or continuous. In a logistic regression, the output of the model represents the log odds that the source of the extracted features is a member of a given class. In a binary classification task, these log odds can be used directly as a confidence value for class membership or converted via the logistic function to a probability of class membership given the extracted features.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used, but a continuous parameter can be computed according to a number of decision trees that select a given class.

In some implementations, where images are selected from each of a plurality of categories, multiple machine learning models may be used. Where the images represent different time periods after administration of a dye, multiple clinical parameters may be determined. For example, early or mid-stage images are used for assessment of nonperfusion, microaneurysms, and vascular structure, while late images are useful for assessing vessel leakage. In other implementations, the plurality of machine learning models are used to generate in single clinical parameter. In these instances, the machine learning model 232 can include an arbitration element that provides a coherent result from the various algorithms. Depending on the outputs of the various models, the arbitration element can simply select a class from a model having a highest confidence, select a plurality of classes from all models meeting a threshold confidence, select a class via a voting process among the models, or assign a numerical parameter based on the outputs of the multiple models. Alternatively, the arbitration element can itself be implemented as a classification model that receives the outputs of the other models as features and generates one or more output classes for the patient. Regardless of the specific model employed, the clinical parameter generated at the machine learning model 232 can be provided to a user at the output device 214 via a user interface 226 or stored on the non-transitory computer readable medium 220, for example, in an electronic medical record associated with the patient.

Figure 3:
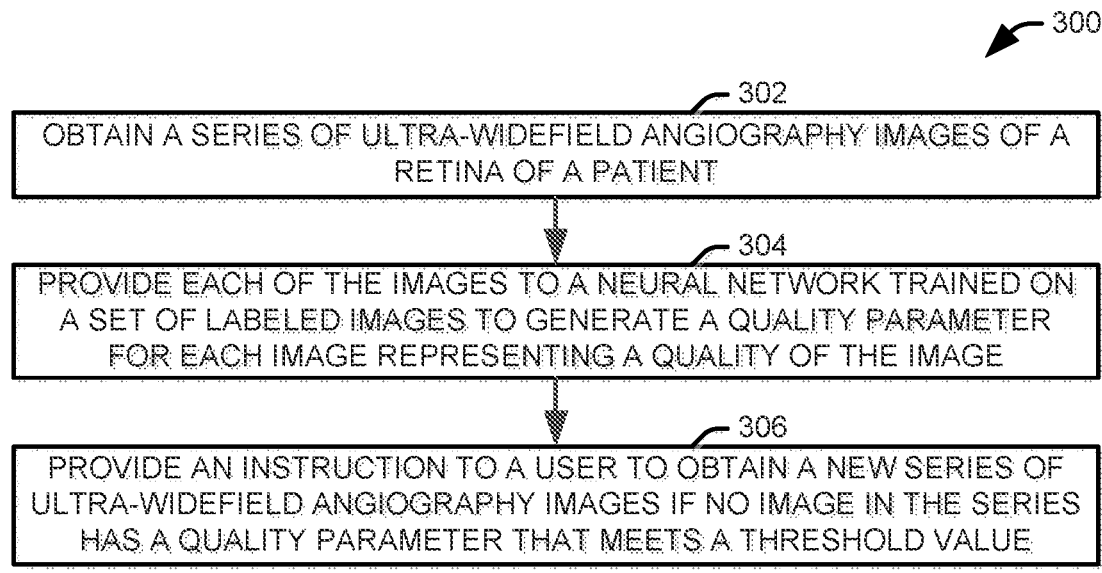
FIG. 3 illustrates an example of a method for fully automated quality assessment of ultra-widefield angiography images.
Figure 4:
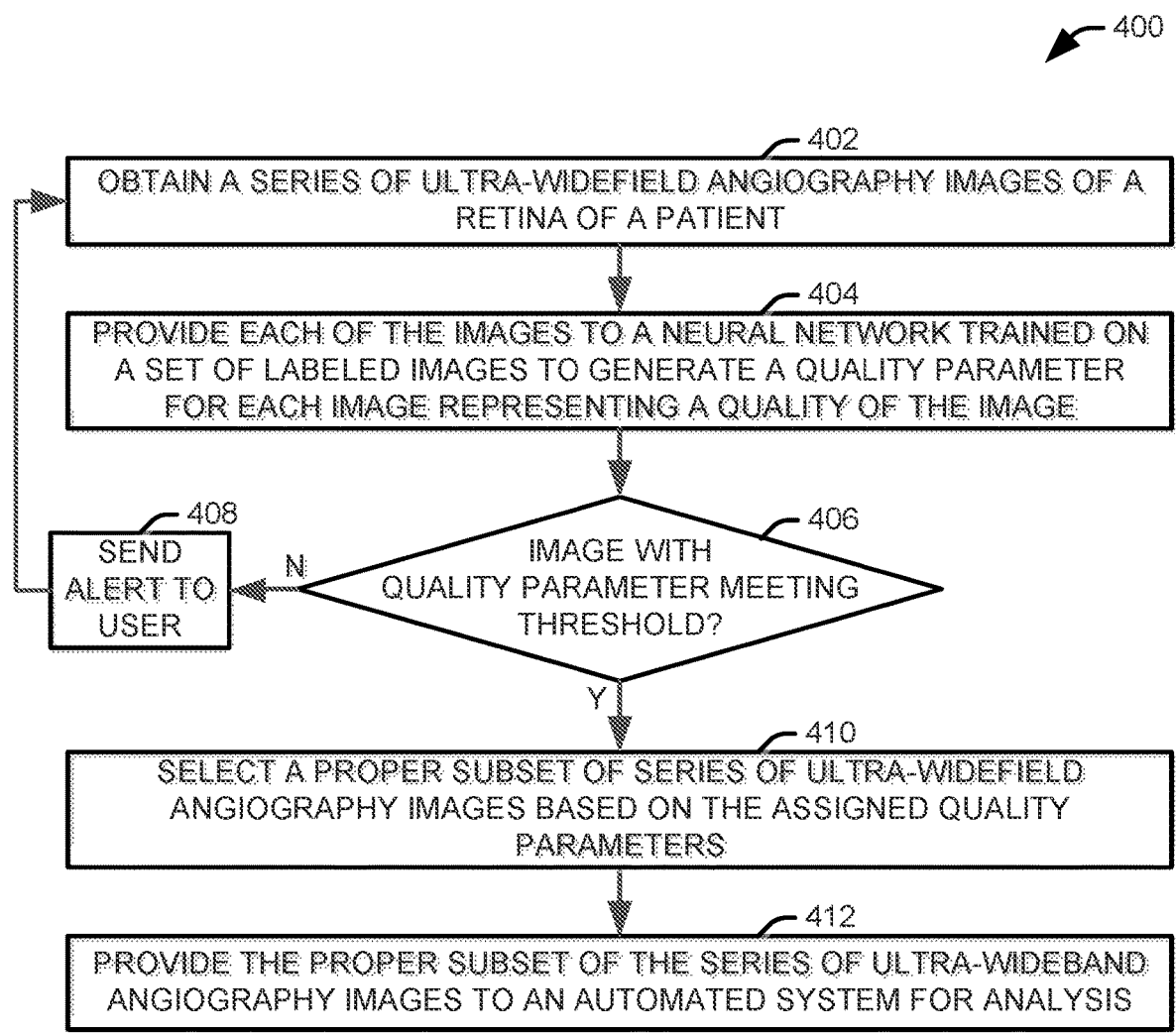
FIG. 4 illustrates an example of a method for fully automated analysis of ultra-widefield angiography images.

In view of the foregoing structural and functional features described above, a method in accordance with various aspects of the present invention will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 3 illustrates an example of a method 300 for fully automated quality assessment of ultra-widefield angiography images. At 302, a series of ultra-widefield angiography images of a retina of a patient is obtained. Each of the series of ultra-widefield angiography images is provided at 304 to a neural network trained on a set of labeled images to generate a quality parameter for each image representing a quality of the image. Each of the set of labeled images is assigned to one of a plurality of classes representing image quality. In one implementation, the plurality of classes used for labelling the data in includes a first class, representing a highest image quality, a second class, representing an acceptable level of image quality, a third class, representing a poor level of image quality, and a fourth class, representing images that are unacceptable for use in assessing the state of the retina of the patient. In another implementation, the images are labeled as either a first class, representing images acceptable for use in assessing the state of the retina of the patient and a second class, representing images that are unacceptable for use in assessing the state of the retina of the patient.

At 306, an instruction is provided to a user to obtain a new series of ultra-widefield angiography images of the retina of the patient if no image of the series of ultra-widefield angiography images has a quality parameter that meets a threshold value. Once acceptable images have been acquired, one or more images can be provided to a user and/or sent to an automated system. When the image is provided to the user, it can be provided to the user at a display or other output device via a user interface. Where the images are provided to the automated system, they can be stored in memory for an automated system implemented on a same hardware as the software used for quality assessment, sent to other, local hardware via a bus, or transmitted to another system hosting the automated system via a network interface.

FIG. 4 illustrates an example of a method for fully automated analysis of ultra-widefield angiography images. At 402, a series of ultra-widefield angiography images of a retina of a patient is obtained. Each of the series of ultra-widefield angiography images is provided at 404 to a neural network trained on a set of labeled images to generate a quality parameter for each image representing a quality of the image. Each of the set of labeled images is assigned to one of a plurality of classes representing image quality. In the illustrated implementation, the plurality of classes used for labelling the data in includes a first class, representing a highest image quality, a second class, representing an acceptable level of image quality, a third class, representing a poor level of image quality, and a fourth class, representing images that are unacceptable for use in assessing the state of the retina of the patient.

At 406, it is determined if any of the series of ultra-wideband angiography images have a quality parameter that meets a threshold value. In one example, where the quality parameter is an ordinal categorical parameter, the threshold value is selected to represent a minimum acceptable level of image quality. If not (N), an alert is provided to a user at 408, and the method returns to 402 to obtain a new series of ultra-widefield angiography of the retina of the patient. If images having a quality parameter meeting the threshold are available (Y), the method advances to 410, where a proper subset of the series of ultra-widefield angiography images is selected according to the quality parameter generated for each image at the neural network. It will be appreciated that the proper subset of the series of ultra-widefield angiography images can consist of a single image. In one example, in which the quality parameter is ordinal, the proper subset of the series of ultra-widefield angiography images can include a predetermined number of the highest ranked images. In another example, in which the quality parameter is ordinal categorical, the proper subset of the series of ultra-widefield angiography images can include all images having one of a set of predetermined values for the quality parameter, such as the value representing images of the highest quality, or a randomly selected subset of these images. In one implementation, a rule-based expert system can be applied to select an appropriate number of images using the ordinal categorical quality parameters and other data associated with the images. In a further example, in which the quality parameters are continuous, a predetermined number of images having values for the quality parameters representing the best quality (e.g., the highest values) can be selected. Alternatively, all images having a quality parameter meeting a threshold value can be provided.

At 412, the proper subset of the series of ultra-wideband angiography images is provided to an automated system. In one implementation, the automated system is a second neural network that receives the proper subset of the series of ultra-widefield angiography images and generates a segmentation boundary, representing a structure within the retina of the patient, within an image of the proper subset of the series of ultra-widefield angiography images. In another implementation, the automated system is a machine learning model that evaluates the proper subset of the series of ultra-widefield angiography images and generates a clinical parameter representing a state of the retina of the patient. In either implementation, the model associated with the automated system can be is trained on a set of training images that have each been analyzed at the neural network and assigned a quality parameter that meets the threshold value.

Figure 5:
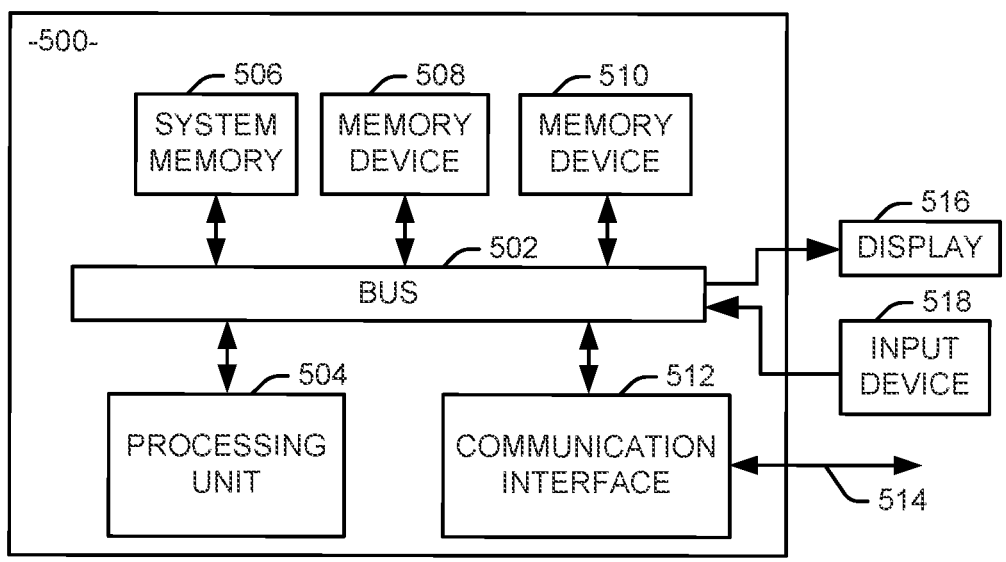
FIG. 5 is a schematic block diagram illustrating an exemplary system of hardware components capable of implementing examples of the systems and methods disclosed herein.

FIG. 5 is a schematic block diagram illustrating an exemplary system 500 of hardware components capable of implementing examples of the systems and methods disclosed in FIGS. 1-4, such as the automated image quality evaluation systems illustrated in FIGS. 1 and 2. The system 500 can include various systems and subsystems. The system 500 can be any of personal computer, a laptop computer, a workstation, a computer system, an appliance, an application-specific integrated circuit (ASIC), a server, a server blade center, or a server farm.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The system 500 could be implemented in a computing cloud. In such a situation, features of the system 500, such as the processing unit 504, the communication interface 512, and the memory devices 508 and 510 could be representative of a single instance of hardware or multiple instances of hardware with applications executing across the multiple of instances (i.e., distributed) of hardware (e.g., computers, routers, memory, processors, or a combination thereof). Alternatively, the system 500 could be implemented on a single dedicated server.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of an image quality evaluation system in accordance with the present invention. Computer executable logic for implementing the composite applications testing system resides on one or more of the system memory 506, and the memory devices 508, 510 in accordance with certain examples. The processing unit 504 executes one or more computer executable instructions originating from the system memory 506 and the memory devices 508 and 510. It will be appreciated that a computer readable medium can include multiple computer readable media each operatively connected to the processing unit.

Specific details are given in the above description to provide a thorough understanding of the embodiments. However, it is understood that the embodiments can be practiced without these specific details. For example, systems are shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The terms "computer readable medium" and "machine readable medium" includes, but is not limited to portable or fixed storage devices, optical storage devices, wireless channels, and/or various other storage mediums capable of storing that contain or carry instruction(s) and/or data. It will be appreciated that a "computer readable medium" or "machine readable medium" can include multiple media each operatively connected to a processing unit.

While the principles of the disclosure have been described above in connection with specific apparatuses and methods, it is to be clearly understood that this description is made only by way of example and not as limitation on the scope of the disclosure.

Having described the invention, we claim:

1. A method for fully automated quality assessment of ultra- widefield angiography images, comprising:
    obtaining a series of ultra-widefield angiography images of a retina of a patient;
    providing each of the series of ultra-widefield angiography images to a neural network trained on a set of labeled images to generate a quality parameter for each of the series of ultra-widefield angiography images representing a quality of the image, each of the set of labeled images being assigned to one of a plurality of classes representing image quality, the plurality of classes comprising a first class, representing a highest image quality in which each image has a field of view above a first threshold percentage, a second class, representing an acceptable level of image quality in which each image has a field of view above a second threshold percentage, a third class, representing a poor level of image quality in which each image has a field of view above a third threshold percentage, and a fourth class, representing images that are unacceptable for use in assessing the state of the retina of the patient; and
    providing an instruction to a user to obtain a new series of ultra-widefield angiography images of the retina of the patient if no image of the series of ultra- widefield angiography images has a quality parameter that meets a threshold value.

2. The method of claim 1, providing a proper subset of the series of ultra-widefield angiography images to one of a user and an automated system to assess a state of the retina of the patient, the proper subset of the series of ultra-widefield angiography images being selected according to the quality parameter generated for each image at the neural network.

3. The method of claim 1, wherein the first threshold percentage is ninety percent, the second threshold percentage is seventy percent, and the third threshold percentage is fifty percent.

4. The method of claim 1, wherein the plurality of classes comprises a first class, representing images acceptable for use in assessing the state of the retina of the patient and a second class, representing images that are unacceptable for use in assessing the state of the retina of the patient.

5. A system for fully automated quality assessment of ultra-widefield angiography images, the system comprising:
a processor; and
a non-transitory computer readable medium storing instructions executable by the processor, the machine executable instructions comprising:
an image interface that receives a series of ultra-widefield angiography images of a retina of a patient;
a neural network, trained on a set of labeled images, that generates a quality parameter for each of the series of ultra-widefield angiography images representing a quality of the image, each of the set of labeled images being assigned to one of a plurality of classes representing image quality, the plurality of classes comprising a first class, representing a highest image quality in which each image has a field of view above a first threshold percentage, a second class, representing an acceptable level of image quality in which each image has a field of view above a second threshold percentage, a third class, representing a poor level of image quality in which each image has a field of view above a third threshold percentage, and a fourth class, representing images that are unacceptable for use in assessing the state of the retina of the patient; and
a user interface that provides an instruction to a user to obtain a new series of ultra-widefield angiography images of the retina of the patient if no image of the series of ultra-widefield angiography images has a quality parameter that meets a threshold value.

6. The system of claim 5, wherein the neural network comprises:
an input layer that receives that receives a given image of the series of ultra- widefield angiography images as an input;
a series of image processing modules that receives the content of the input layer and provides an output representing the given image of the series of ultra-widefield angiography images, each of the series of image processing modules comprising:
a set of convolutional layers that each receive the content of a previous layer and apply a convolution operation, represented by a convolutional kernel having an associated kernel size, to provide a convolved output; and
a pooling layer that replaces sets of pixels within the convolved output with representative values to reduce the dimensionality of the convolved output into a pooled output; and
at least one fully connected layer that provides the quality parameter from the output of the series of image processing modules.

7. The system of claim 6, wherein the kernel size is five.

8. The system of claim 5, further comprising an image selector that selects a proper subset of the series of ultra-widefield angiography images according to the quality parameter generated for each image at the neural network.

9. The system of claim 8, further comprising a second neural network that receives the proper subset of the series of ultra-widefield angiography images and generates a segmentation boundary within an image of the proper subset of the series of ultra-widefield angiography images, the segmentation boundary representing a structure within the retina of the patient.

10. The system of claim 9, wherein the second neural network is trained on a set of training images, each of the set of training images having a quality parameter, generated by the neural network, that meets the threshold value.

11. The system of claim 8, further comprising a machine learning model that evaluates the proper subset of the series of ultra-widefield angiography images and generates a clinical parameter representing a state of the retina of the patient.

12. The system of claim 11, wherein the machine learning model is trained on a set of training images, each of the set of training images having a quality parameter, generated by the neural network, that meets the threshold value.

13. The system of claim 5, wherein the quality parameter is an ordinal categorical parameter that can assume a first value, representing a highest image quality, a second value, representing an acceptable level of image quality, a third value, representing a poor level of image quality, and a fourth value, representing images that are unacceptable for use in assessing the state of the retina of the patient.

14. The system of claim 13, wherein the threshold value is the second value, such that the user interface provides the instruction to the user if no image of the series of ultra-widefield angiography images has a quality parameter with the first value or the second value.

15. A system for fully automated quality assessment of ultra- widefield angiography images, the system comprising:
an ultra-widefield angiography imaging system;
a processor; and
a non-transitory computer readable medium storing instructions executable by the processor, the machine executable instructions comprising:
an image interface that receives a series of ultra-widefield angiography images of a retina of a patient from the ultra-widefield angiography imaging system;
a neural network, trained on a set of labeled images, that generates a quality parameter for each of the series of ultra-widefield angiography images representing a quality of the image, each of the set of labeled images being assigned to one of a plurality of classes representing image quality, the plurality of classes comprising a first class, representing a highest image quality in which each image has a field of view above a first threshold percentage, a second class, representing an acceptable level of image quality in which each image has a field of view above a second threshold percentage, a third class, representing a poor level of image quality in which each image has a field of view above a third threshold percentage, and a fourth class, representing images that are unacceptable for use in assessing the state of the retina of the patient;
a user interface that provides an instruction to a user to obtain a new series of ultra-widefield angiography images of the retina of the patient if the no image of the series of ultra-widefield angiography images has a quality parameter that meets a threshold value; and
an image selector that selects a proper subset of the series of ultra- widefield angiography images according to the quality parameter generated for each image at the neural network.

16. The system of claim 15, further comprising a machine learning model that generates one of a segmentation boundary within an image of the proper subset of the series of ultra-widefield angiography images representing a structure within the retina of the patient and a clinical parameter representing a state of the retina of the patient from the proper subset of the series of ultra-widefield angiograph images.

17. The system of claim 15, wherein the quality parameter is an ordinal categorical parameter that can assume a first value, representing a highest image quality, a second value, representing an acceptable level of image quality, a third value, representing a poor level of image quality, and a fourth value, representing images that are unacceptable for use in assessing the state of the retina of the patient, and the threshold value is the second value, such that the user interface provides the instruction to the user if no image of the series of ultra-widefield angiography images has a quality parameter with the first value or the second value.

\* \* \* \* \*